(No Model.)
M. ROONEY.
TETHER.
No. 466,529.
Patented Jan. 5, 1892.
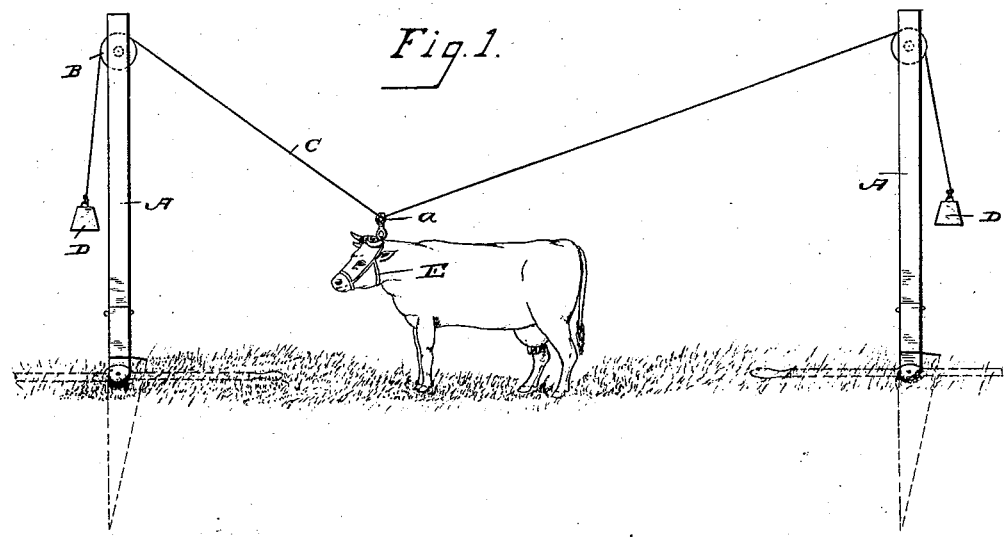
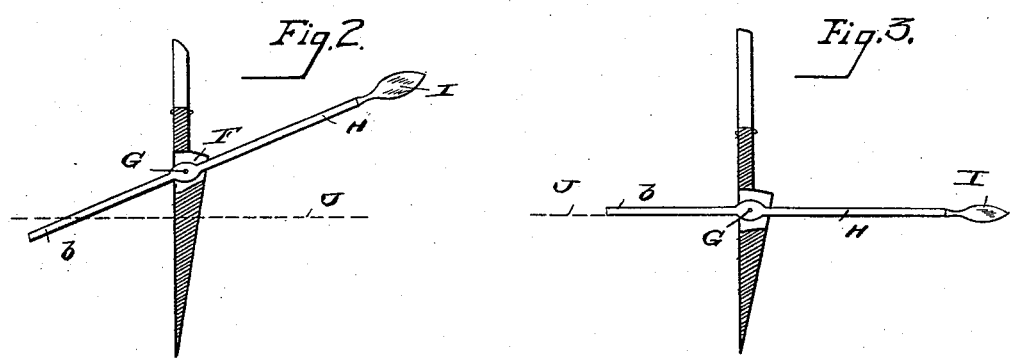
Witnesses:
G. D. Kesler
C. B. Woodbury
Michael Rooney
Inventor:
Chas. E. Barber
His Attorney.

UNITED STATES PATENT OFFICE.

MICHAEL ROONEY, OF QUINCY, ILLINOIS.

TETHER.

SPECIFICATION forming part of Letters Patent No. 466,529, dated January 5, 1892.

Application filed June 22, 1889. Serial No. 315,189. (No model.)

*To all whom it may concern:*

Be it known that I, MICHAEL ROONEY, of Quincy, in the county of Adams and State of Illinois, have invented certain new and useful Improvements in Tethers; and I do hereby declare the following to be a full, clear, and exact description of the invention, such as will enable others skilled in the art to which it appertains to make and use the same.

This invention relates to tethers for stock, and has for its object the provision of a device which may be readily and easily removed from place to place.

Another object of the invention is to provide a device by the use of which an animal may be secured within certain predetermined limits without liability of the animal becoming tangled up in the cable used.

In the accompanying drawings, Figure 1 is a side elevation of an animal and the device used to secure the animal within certain predetermined limits for grazing. Fig. 2 is a detail view of the post and the lever used to raise the same out of the ground, the post being partly raised in this figure. Fig. 3 is a similar view showing the post down in the ground a sufficient distance to bring the lifting-lever about level with the surface of the ground.

In the accompanying drawings, A designates the posts, to the top of which is secured pulleys B, which are suitably grooved and over which passes the cable C, and to each end of which are secured weights D D. A halter E is secured to the animal's head and a ring *a* encircles the cable C and is secured to the top of the halter E. The posts A A are provided with recesses or mortises F, provided with pivotal pins G G, which extend through the pivoted levers H H, provided with handles I.

The operation of the device is as follows: The posts A A are forced down into the ground in an upright position, as shown in Fig. 1, and they extend down into the ground until the lever H is extending horizontally about flush with the ground-line J, as shown in Fig. 4. When it is desired to move the posts, the operator may grasp the handle I and raise it up, thus lifting the lever H and raising the posts A A, the end opposite the end to which the handle is secured pressing on the ground for its fulcrum at the point *b*, as will be readily understood by reference to the drawings and more particularly to Fig. 4.

Having fully described my invention, what I claim as new, and desire to secure by Letters Patent, is—

The combination, with a cable, of stakes for supporting the cable, said stakes having projecting shoulders, slots, and tapering ends, and a lever pivoted in each slot and projecting from the opposite sides thereof, substantially as set forth.

In testimony whereof I have signed this specification in the presence of two subscribing witnesses.

MICHAEL ROONEY.

Witnesses:
GEORGE C. McCRONE,
LILIAN H. CHAPMAN.